June 3, 1958     H. H. ANDERSON     2,836,950
TOBACCO CUTTING MACHINE

Filed Oct. 17, 1955     8 Sheets-Sheet 1

Inventor
Harvey H. Anderson, deceased
Cordie Anderson, Administratrix

By Clarence A. O'Brien
and Harvey B. Jacobson
Attorneys

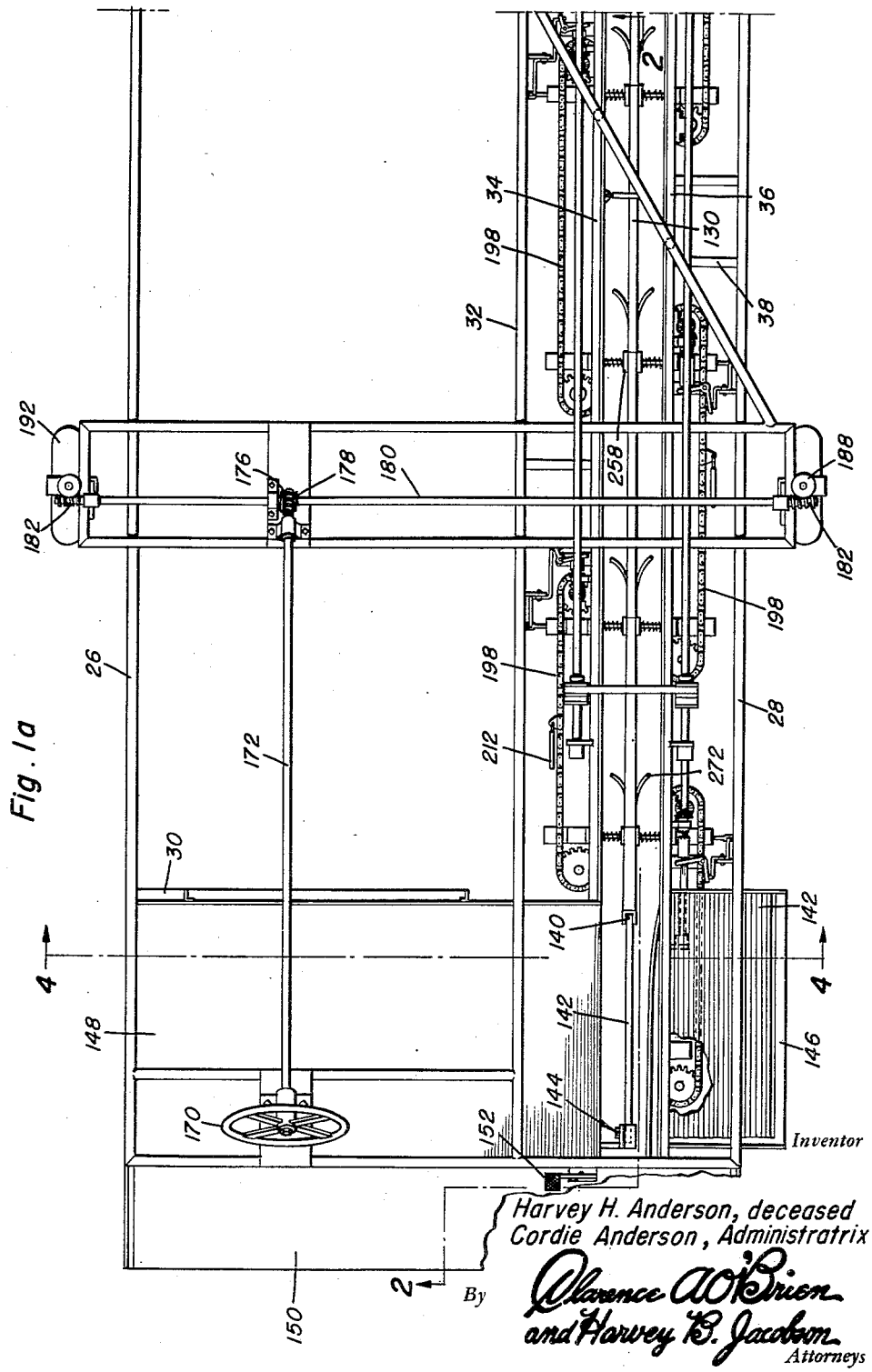

June 3, 1958     H. H. ANDERSON     2,836,950
TOBACCO CUTTING MACHINE
Filed Oct. 17, 1955                         8 Sheets—Sheet 3
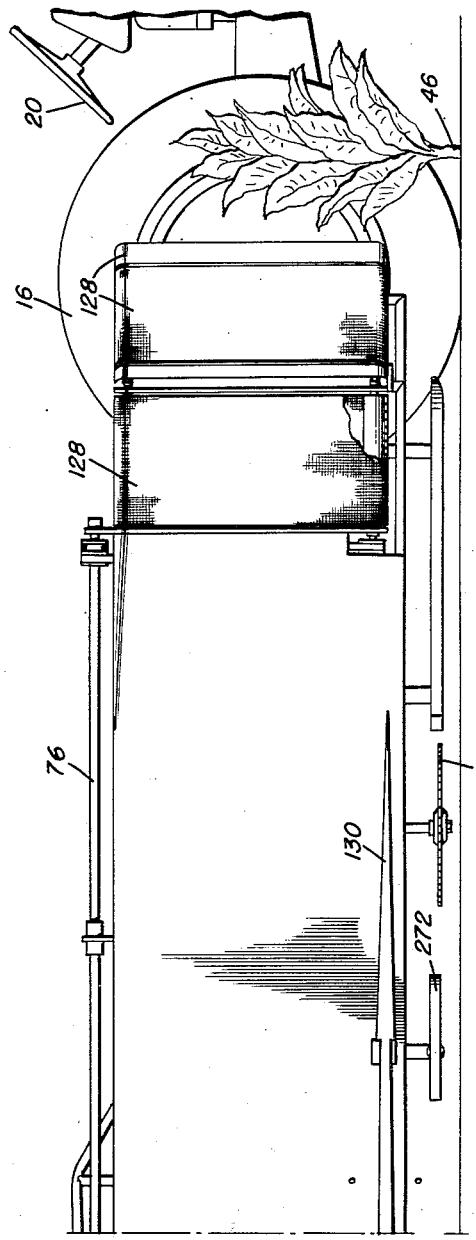
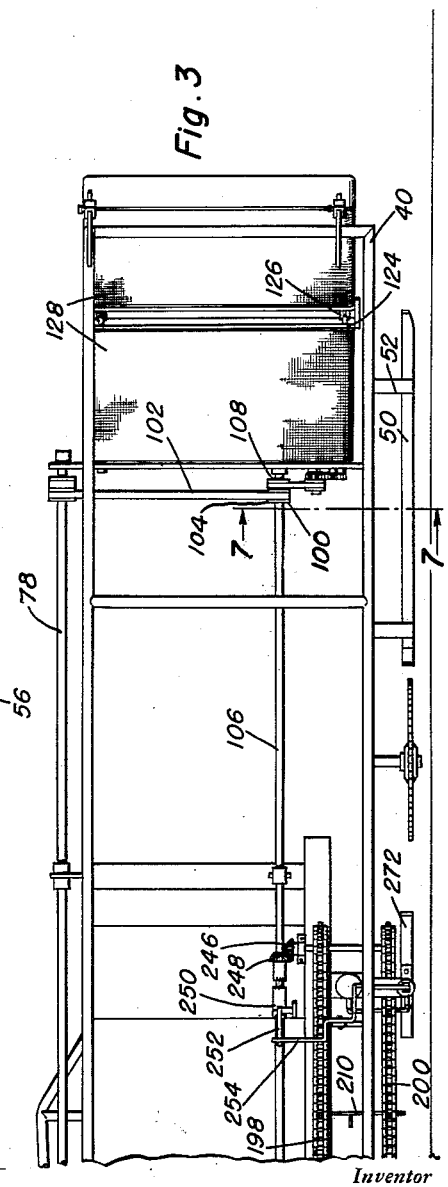
Inventor
Harvey H. Anderson, deceased
Cordie Anderson, Administratrix
By *Clarence A. O'Brien and Harvey B. Jackson*
Attorneys June 3, 1958  H. H. ANDERSON  2,836,950
TOBACCO CUTTING MACHINE
Filed Oct. 17, 1955  8 Sheets-Sheet 4
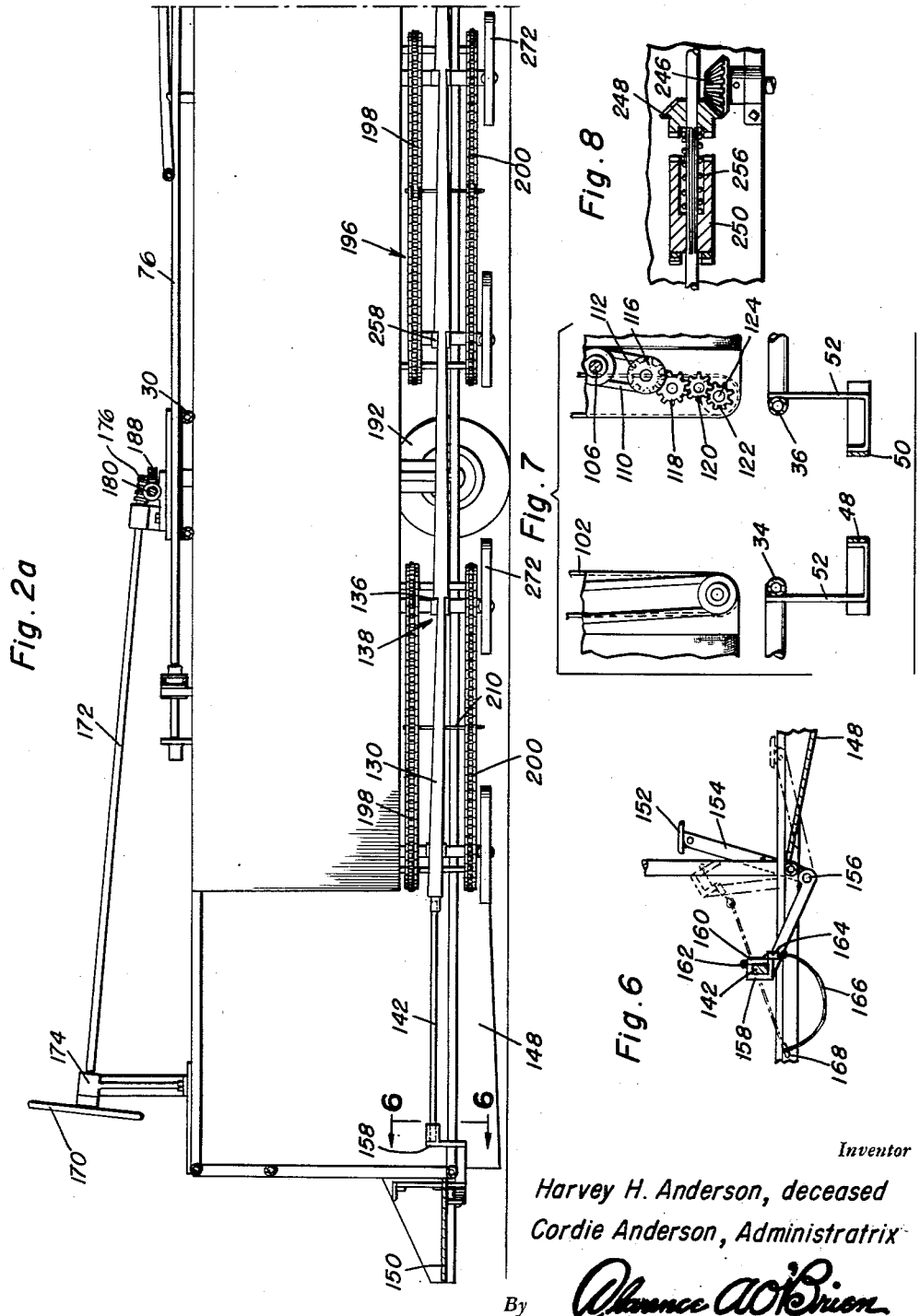
Inventor
Harvey H. Anderson, deceased
Cordie Anderson, Administratrix
By Clarence A. O'Brien
and Harvey B. Jacobson
Attorneys June 3, 1958 H. H. ANDERSON 2,836,950
TOBACCO CUTTING MACHINE
Filed Oct. 17, 1955 8 Sheets-Sheet 5

Inventor
Harvey H. Anderson, deceased
Cordie Anderson, Administratrix
By Clarence A. O'Brien
and Harvey B. Jacobson
Attorneys June 3, 1958 H. H. ANDERSON 2,836,950
TOBACCO CUTTING MACHINE
Filed Oct. 17, 1955 8 Sheets-Sheet 6
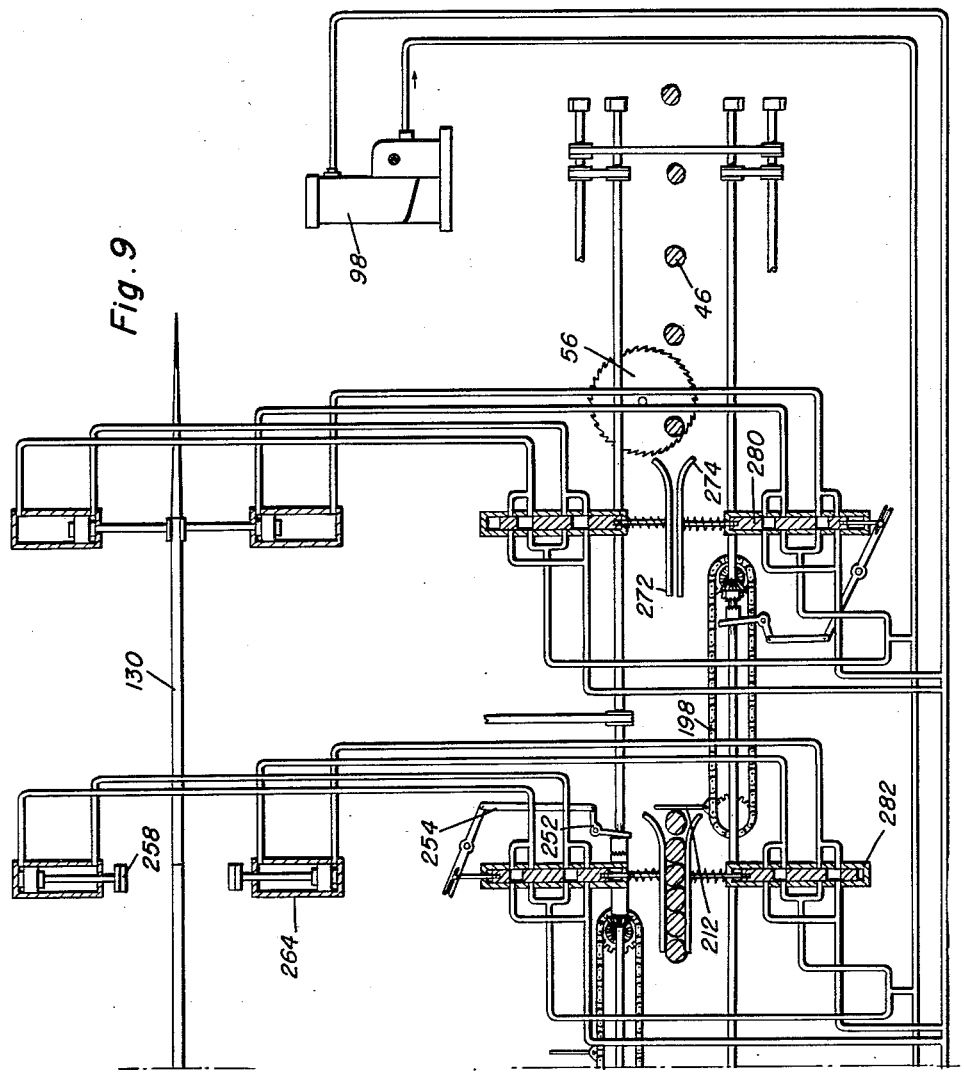
Inventor
Harvey H. Anderson, deceased
Cordie Anderson, Administratrix
By
Attorneys June 3, 1958  H. H. ANDERSON  2,836,950
TOBACCO CUTTING MACHINE
Filed Oct. 17, 1955  8 Sheets-Sheet 7

Inventor
Harvey H. Anderson, deceased
Cordie Anderson, Administratrix

By Clarence A. O'Brien
and Harvey B. Jacobson
Attorneys

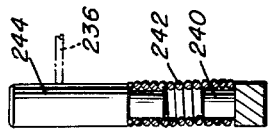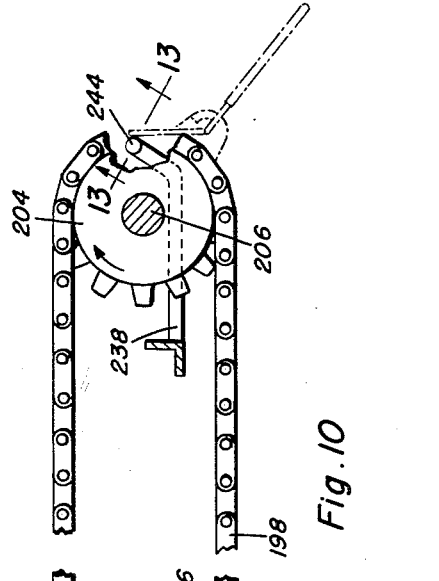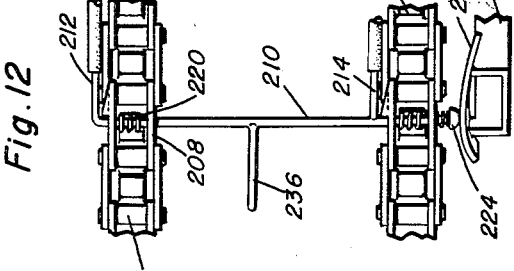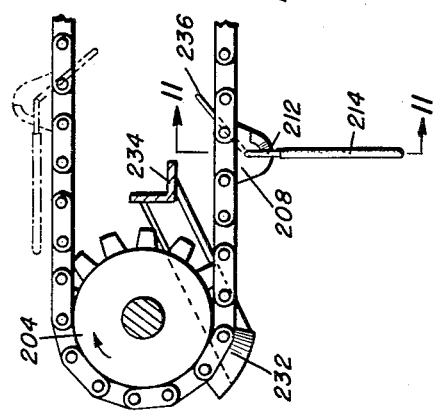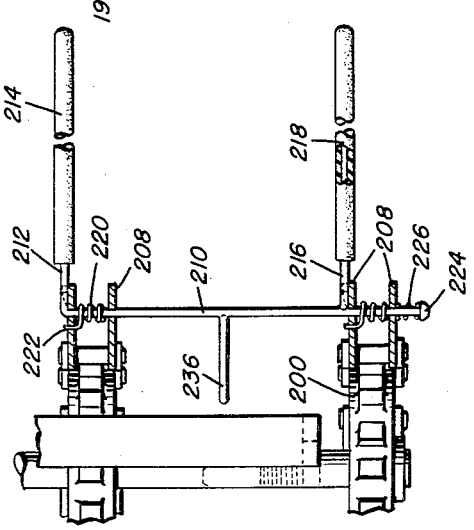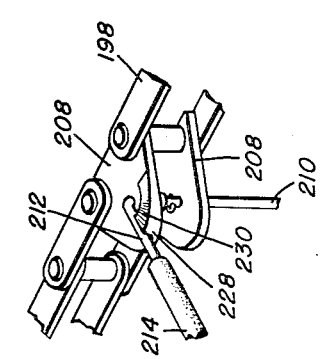

United States Patent Office 2,836,950
Patented June 3, 1958

2,836,950

TOBACCO CUTTING MACHINE

Harvey H. Anderson, deceased, late of Harrodsburg, Ky., by Cordie Anderson, administratrix, Harrodsburg, Ky.

Application October 17, 1955, Serial No. 540,768

5 Claims. (Cl. 56—27.5)

This invention generally relates to a tobacco cutting machine, and more specifically provides a machine for traversing rows of tobacco and cutting the tobacco plants at a point adjacent the surface of the ground after which the severed tobacco plants are conveyed rearwardly on the machine and are impaled upon tobacco sticks in position for drying wherein the entire procedure is performed substantially automatically with very little expenditure of human labor.

In the harvesting of tobacco plants in certain regions where the entire plant and stalk are severed, it has been customary for the tobacco plants to be cut by hand and positioned on the ground surface to permit wilting and partial curing thereof. After this procedure, the tobacco must be picked up and impaled upon the usual tobacco sticks for hanging in the curing barns. This procedure requires the expenditure of a relatively great deal of labor and time and is very inefficient. Accordingly, it is the primary object of the present invention to provide a machine for cutting the tobacco and impaling the same upon tobacco sticks so that it is then ready to be hung into the tobacco curing barns.

Another object of the present invention is to provide a tobacco cutting machine adapted to straddle at least one row of tobacco plants wherein vertically disposed endless belt conveyors are provided at the forward end of the machine for engaging the tobacco plants as they enter the machine for moving the leaves on the tobacco plant upwardly and towards the main stem or stalk of the plants.

Another important object of the present invention is to provide a tobacco cutting machine having novel chain conveyors for moving the tobacco plants rearwardly after they have been cut wherein the conveying chains are provided with projecting members which are retractible in certain portions of their movement and extended in certain portions of their movement, wherein improved and novel means is provided for the actuation of the extending members on the conveying chains.

Yet another object of the present invention is to provide a tobacco cutting machine having a rotatable horizontally disposed saw-type cutter together with an elongated pointed spear member for projecting through the stalks of the tobacco plants wherein the rear end of the spear member is provided with a tobacco stick which forms a longitudinal extension thereof whereby the tobacco stalks may be moved from the spear onto the tobacco sticks.

Still another important feature of the present invention is to provide a tobacco cutting machine having hydraulically actuated gripping members which automatically retain a particular number of tobacco plants in adjacent relation wherein the gripping members are automatically released and actuated for gripping and releasing the tobacco plants so that a predetermined number of tobacco plants will be retained in adjacent position for disposition on a tobacco stick.

Other objects of the present invention will reside in its simplicity of construction, ease of operation, efficiency, adaptation for its particular purposes, and its relatively inexpensive manufacturing and operation costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1 and 1A form a top plan view of the tobacco cutting machine of the present invention illustrating its relationship to a row of tobacco plants and a towing tractor together with other details thereof;

Figures 2 and 2A form a sectional view of the construction of Figures 1 and 1A taken generally along section lines 2—2 and 2A—2A of Figures 1 and 1A;

Figure 3 is a detailed side elevational view taken substantially upon a plane passing along reference line 3—3 of Figure 1 illustrating the driving means for the forward vertically disposed rollers together with the driving means for the chain conveyors;

Figure 6 is a detailed sectional view taken substantially upon a plane passing along section line 6—6 of Figure 2A illustrating the means for removing the tobacco stick from the rear of the impaling spear;

Figure 7 is an enlarged detailed sectional view taken substantially upon a plane passing along section line 7—7 of Figure 3 illustrating further structural details of the endless belt driving members;

Figure 8 is a detailed elevational view with parts broken away and shown in section for illustrating the details of a clutch in the drive mechanism for the chain conveyors;

Figure 9A:
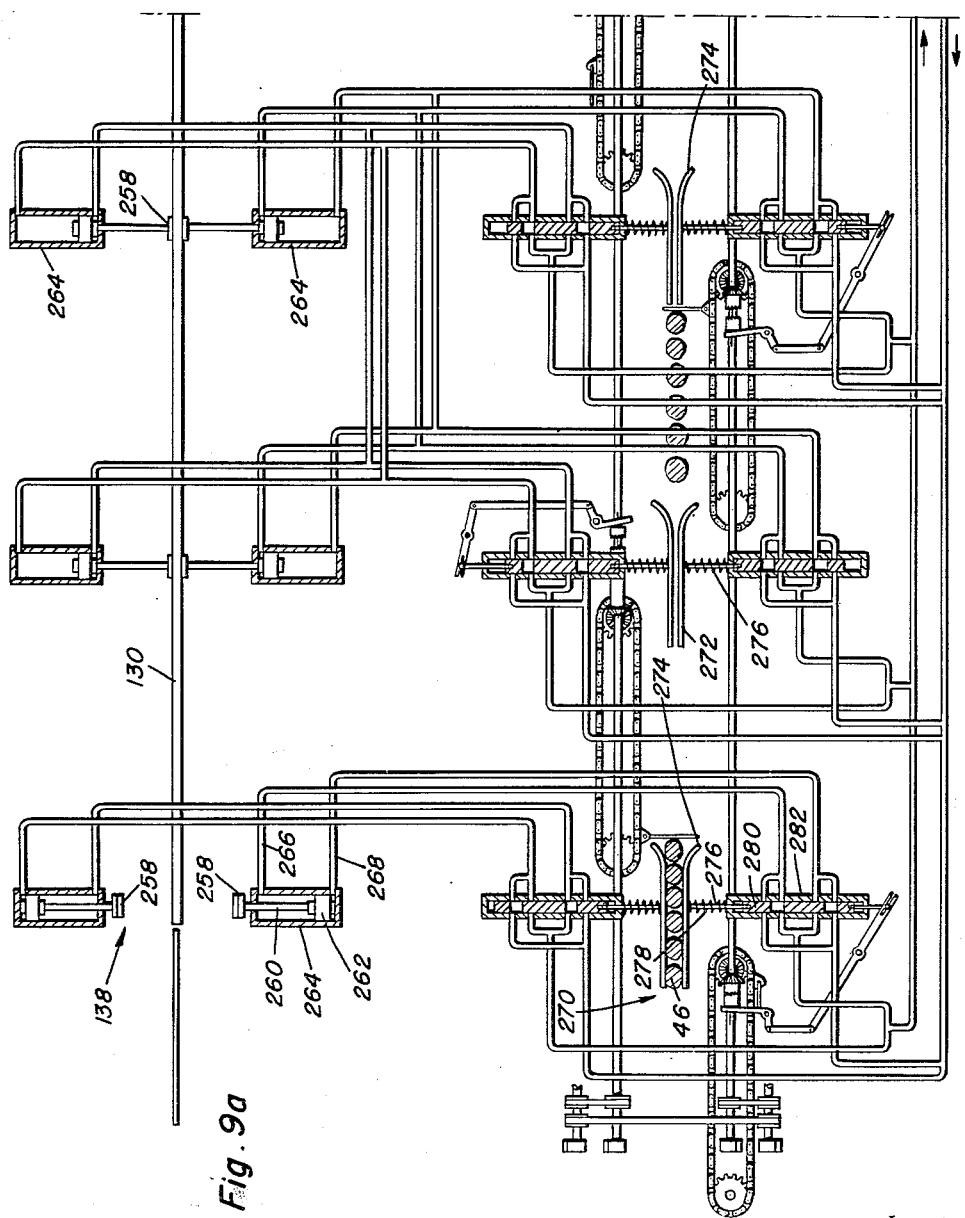

Figures 9 and 9A form a schematic lay-out of the hydraulic control system for automatically controlling the movement of the tobacco plants through the cutting machine;

Figure 10 is an enlarged fragmentary plan view of one of the chain conveyors together with the projecting members thereon and the means for extending and retracting the projecting members for engaging tobacco plants for moving the same rearwardly;

Figure 11 is a detailed sectional view taken substantially upon a plane passing along section line 11—11 of Figure 10 illustrating the details of the projecting members together with the relationship of the axial springs and the means for actuation thereof;

Figure 12 is a side elevatonal view illustrating the projecting members in retracted position and illustrating the cam to permit the projecting members to be retracted;

Figure 13 is an enlarged detail sectional view taken substantially upon a plane passing along section line 13—13 of Figure 10 illustrating the member for extending the projecting members to a projected position; and Figure 14 is an enlarged detail perspective view illustrating the latch for releasably retaining the projecting members in laterally extending position.

Referring now specifically to the drawings, the numeral 10 generally designates the tobacco cutting machine of the present invention for attachment to the drawbar 12 of a tractor generally designated by the numeral 14 which is provided with the usual rear driving wheels 16, steering wheel 18 and operator's seat 20 for operation of the tractor 14 in the usual manner. The tobacco cutting machine 10 is attached to the tractor 14 by a suitable hitch 22 at the forward end of a supporting frame generally designated by the numeral 24 which forms a portion of the tobacco cutting machine 10.

The frame 24 includes parallel longitudinal side members 26 and 28 which are in the form of longitudinal rails together with a plurality of transverse rails 30 which forms a rigid frame 24. The frame 24 is constructed of conventional tubular members having suitable bracing for providing rigidity thereto with the various elements being interconnected by any suitable means such as welding, riveting, or bolting and it is pointed out that the various longitudinal, vertical and transverse members may be altered as desired for providing the desired rigid frame for accommodating and supporting the associated working elements as set forth hereinafter. As will be seen in Figures 1 and 1A, an inner longitudinal rail 32 is provided in spaced parallel relation to the longitudinal rail 28 and spaced inwardly from each of the rails 28 and 32 is a longitudinal guide member 34 and 36 which are supported by transverse brace members 38. The forward end of the guide rails 34 and 36 flare outwardly, as designated by the numeral 40, for guiding tobacco plants generally designated by the numeral 42 into the tobacco cutting machine 10. The tobacco plants 42 are provided with leaves 44 and a main stalk portion 46 and are normally disposed in spaced rows which are in generally parallel relation. The outwardly flared forward ends of the longitudinal guide members 34 and 36 form a guide for the tobacco plants 42 wherein the forward ends of the rails 28 and 32 as well as the guide rails 36 and 34 terminate forwardly of the hitch 22 at a position spaced laterally of the tractor 14 to permit access to the tobacco plants 42 and to permit observation of the relationship between the tobacco plants 42 and the tobacco machine 10 so that the operator of the tractor 14 may guide the tractor accordingly so that the tobacco plants will be properly guided between the longitudinal guide rails 34 and 36.

Adjacent the front end of the longitudinal guide rails 34 and 36 is a pair of parallel guide members 48 and 50 which are disposed in parallel relation inwardly of the guide rails 34 and 36 and supported in depending relation therefrom by brackets 52. The outer ends of the guide members 48 and 50 are outwardly flared, as designated by the numeral 54 for the purpose of acting as an additional guide to the tobacco plants 42. Disposed rearwardly of the guide members 48 and 50 is a circular saw 56 supported on a bearing member 58 which is supported on the longitudinal guide rail 34 exteriorly of the area between the guide rails 34 and 36. The periphery of the saw 56 is provided with cutting teeth 60 which project into the area between the longitudinal guide rails 34 and 36 sufficiently to assure that the stalks 46 of the tobacco plants 42 passing through the guide members 48 and 50 will be severed adjacent the ground surface. The saw 56 is mounted on a vertically disposed shaft 62 rotatably journaled in the bearing 58 and the upper end of the shaft 62 is provided with a collar 64 removably attached thereto to permit removal of the saw 56 when desired. Below the bearing 58 is disposed a V-belt pulley 66 attached to the shaft 62 for receiving a V-belt 68 for driving or rotating the saw 56 about a vertical axis.

Extending upwardly from the various longitudinal rails are a plurality of vertical members 70 which are interconnected by transverse braces 72. Journaled on bearings 74 on certain of the braces 72 is a pair of longitudinal shafts 76 and 78 each of which is provided with aligned V-belt pullieys 79 having a V-belt 80 encircling the same for rotating the shafts 76 and 78 in unison. In spaced relation to the V-belt pulleys 79 is a drive pulley 82 on shaft 76 receiving a drive V-belt 84. Supported on the frame 24 is an internal combustion engine 86 of any well known construction having a drive shaft 88 which is utilized as the input for a power transfer case 90 which drives a V-belt pulley 92 which drives the V-belt 84 together with a V-belt pulley 94 which drives the V-belt 58 for rotating the saw 56 and also drives a shaft 96 for driving a hydraulic fluid pump 98 for a purpose described hereinafter. The internal combustion engine 86 may be of any suitable design and supported on any suitable framing members.

Adjacent each of the pulleys 79 is a V-belt pulley 100 receiving vertically disposed V-belts 102 which encircle V-belt pulleys 104 on lower shaft members 106 which are generally in spaced parallel relation to the upper shaft members 76 and 78. The drive V-belt 84 is attached to the lower inner drive shaft 106 and the outermost shaft member 106 is provided with a V-belt pulley 108 having a V-belt 110 thereon for engaging over a V-belt pulley 112 which is provided with a shaft 114 to which is secured to spur gear 116 in meshing engagement with another spur gear 118 which is in turn in meshing engagement with a third spur gear 120 and the third spur gear 120 is in meshing engagement with a fourth spur gear 122 secured to a roller shaft 124 which is articulated by a universal coupling 126 and the roller shaft 124 is provided with a roller thereon which receives an endless belt conveyor member 128 which is disposed over an upper roller at the upper end thereof. The conveying belts 128 are disposed in spaced parallel relation with the inner flights thereof being disposed in a vertical position and moving upwardly, wherein the leaves 44 of the tobacco plants will be engaged and brushed upwardly alongside the stalk 46 of the tobacco plant 42, thereby assuring that the entire tobacco plant 42 will pass inwardly along the area between the longitudinal guide members 48 and 50 for positioning the tobacco plant stalk 46 for severing by the saw 56.

Disposed between the longitudinal guide rails 34 and 36 is an elongated spear 130 having a pointed forward end 132 disposed between the rear ends of the longitudinal guide members 48 and 50 and forwardly of the forwardmost edge of the saw 56 wherein the tobacco plant stalks 46 will be pierced by the pointed end 132 of the spear 130 prior to the severing thereof by the saw 56. The elongated spear 130 is provided with a plurality of recesses or notches 136 along the length thereof, and means is provided for supporting the spear 130 adjacent each of the notched areas 136 and these supporting members are generally designated by the numeral 138.

The rear end of the spear 130 is provided with a rearwardly opening recess 140 for receiving one end of a tobacco stick 142 which is attached to a supporting member generally designated by the numeral 144 at the rear end thereof. An upwardly inclined rack 146 is provided for supporting a plurality of the sticks 142 above the normal position of the sticks 142. A downwardly inclined platform 148 is provided adjacent the normal position of the stick 142, thereby permitting discharge of the sticks onto the platform 148 for discharge onto the ground surface or onto a suitable supporting area.

Disposed rearwardly of the platform 148 is an operator's stand or supporting platform 150. Supported adjacent the operator's platform 150 is a step-on treadle 152 pivotally mounted on a bellcrank member 154 which is pivoted at its apex by pivot pin 156 wherein the free end of the bellcrank 154 is provided with a generally rectangular member 158 which forms the major portion of the tobacco stick holding means 144. The tobacco stick 142 is disposed in the rectangular member 158 and the side of the rectangular member designated by the numeral 160 which faces the platform 148 is pivotal to the upper portion of the rectangular member 158 by pivot pin 162 and is retained therein by latch member 164 which retains tobacco stick 142 therein. The latch member 164 is connected to a flexible line 166 which is connected to an eye member 168 which will move the latch member 164 downwardly when the treadle 152 is depressed, thereby permitting the pivotal side 160 to move outwardly to permit discharge of the tobacco stick 142 onto the upper surface of the inclined platform 148, thereby permitting easy removal of the loaded tobacco sticks and also the insertion of a new tobacco stick which is unloaded.

Also disposed adjacent the platform 150 is a steering wheel 170 which is connected to an elongated steering rod 172 mounted on suitable upstanding bearing supports 174 wherein the steering wheel 170 will be accessible to persons standing on the operator's platform 150. The free end of the steering rod 172 is provided with a worm gear 176 in meshing engagement with a worm pinion 178 on a transverse shaft 180 which is provided with worm gears 182 at the outer ends thereof. Depending from the frame is a pair of tubular members 184 pivotally receiving a mounting shaft 186 having a pinion 188 on the upper end thereof in meshing engagement with the worm gears 182 and a yoke 190 at the lower end thereof for journaling a ground engaging wheel 192 wherein rotation of the steering wheel 170 by an operator will rotate the steering rod 172, worm gear 176, worm pinion 178, transverse shaft 180, worm gears 182, worm pinion 188, vertical shafts 186, yoke 190 and the ground engaging wheels 92 thereby giving directional control to the rear portion of the frame 24, thereby permitting control of the machine 10 so that relatively square cornering may be provided to permit maneuvering of the tobacco cutting machine in relatively small areas, thereby increasing the effectiveness of the operation of the device.

For moving the tobacco stalks 46 rearwardly along the spear 130, a plurality of chain conveyors generally designated by the numeral 196 is provided wherein the conveying members or mechanisms 196 on one side of the spear 130 are staggered in relation to the chain conveyors on the other side thereof.

Each of the conveying mechanisms 196 includes a pair of endless chains 198 and 200 disposed in vertically spaced parallel relation and encircling sprocket gears 204 mounted on vertically disposed shafts 206. Certain of the links of each of the chains 198 and 200 are interconnected by spaced parallel plates 208 which are generally triangular and provided with aligned openings for receiving a vertically disposed rod 210 for pivotal movement therein. The upper end of the vertically disposed rod 210 is provided with a lateral extension 212 having a cushion member 214 thereon and the rod 210 just above the lower set of plates 208 is provided with a laterally offset member 216 having a cushion 218 thereon which is in vertically spaced parallel relation to the laterally offset members 212. An axial spring 220 surrounds the portion of the rod 210 disposed between the pairs of plates 208 and is provided with one end portion secured to the upper plate of each pair of plates 208, as designated by the numeral 222, with the other end secured to the rod 210 normally urge the laterally projecting portions 212 and 216 in perpendicular relation to the chains 198 and 200. The lower end of the rod 210 which is disposed beneath the lower set of plates is provided with a headed portion 224 and a compression coil spring 226 is disposed between the headed portion 224 and the undersurface of the lowermost plate 208 for normally urging the rod 210 downwardly with the laterally offset portions 212 and 216 engaging the upper surfaces of the upper plates of each pair of plates 208.

The upper surfaces of each of the upper of the pair of plates 208 are provided with an upstanding lug 228 having a cam upper surface 230 wherein the rod 210 may be pivoted about a vertical axis if the laterally offset portions 212 are raised above the latch or lug 228.

For raising the rod 210 vertically upwardly, a cam member 232 is provided which is supported from a bracket 234 which is in the path of movement of the headed end 224 of the vertical rod 210 wherein the headed end 224 will engage the cam surface 232 and ride upwardly thereover so that the springs 222 and the cam surface 230 will urge the offset portions 212 to a position generally parallel to the chains 198 and 200.

Attached to the vertical rod 210 in opposition to the laterally extending members 212 and 216 is a projecting rod 236 disposed generally centrally within the area between the chains 198 and 200. A bracket 238 extends outwardly beyond the end sprocket 204 and terminates in an upstanding portion 240 having a spring 242 secured thereto with an upstanding rod 244 attached to the upper end of the spring 242 to permit flexing movement of the rod 244. The rod 244 is disposed in the path of movement of the projections 236 when the laterally extending members 212 and 216 are collapsed adjacent and parallel to the chains 198 and 200.

It will be noted that the laterally projecting members 212 and 216 are disposed perpendicularly to chain 198 for projecting beyond the spear 130 above and below the same for engaging the stalks 46 of the tobacco plants 42 for moving the same rearwardly on the spear 130. As the projecting members 212 and 216 move around the sprocket 204 disposed rearwardly of the conveying mechanisms 196, the headed portions 224 will engage the cam 232 and be raised, thereby permitting the projecting members 212 and 216 to be swung to a position alongside the chains 198 and 200, respectively. As the projecting members 212 and 216 pass around the forwardmost sprocket 204, the projecting pin or rod 236 engages the upstanding a abutment rod 244 wherein the rod 210 is again pivoted about a vertical axis and the projecting lateral extensions 212 and 216 ride up the cam surface 230 of the lug 228 until such time as they reach the outermost end thereof wherein they drop down behind the upstanding lug 228 and are locked in projecting position for engaging additional stalks 46 for moving the same rearwardly.

The forwardmost shaft on each of the conveying mechanisms 196 includes a bevel gear 246 in engagement with a bevel gear 248 on the lower shaft 106 wherein the gear 248 is journaled thereon and a slidable member 250 is provided for meshing and clutching engagement with the bevel gear 248 so that the bevel gear 248 will be rotated therewith for driving the conveyors 196. A bellcrank linkage 252 is provided for actuating each of the clutches 250, and the bellcrank 252 is connected to linkage 254 for operation thereof. A compression spring 256 is disposed between the clutch 250 and the bevel gear 248 wherein the clutch 250 will normally be urged away from the bevel gear 248 to permit sliding movement of the bevel gear 248 on the shaft 106.

The means for supporting the elongated spear 130 includes a pair of right angular members 258 which are disposed in opposing relation at each of the recessed portions 136 on the spear 130. The right angular members 258 are each connected to a piston rod 260 having a piston 262 on the inner side thereof which is slidable in a hydraulic cylinder 264 having inlet and outlet fluid conduits 266 and 268 for controlling the movement of the right angular gripping members 258. As the tobacco stalks 46 move along the spear 130, the members 258 will be moved away from the spear 130 to permit passage of a group of the stalks 46 after which the members 258 are again gripped around the spear 130 and subsequent gripping members 258 are released sequentially in response to movement of a plurality of stalks between gripping members generally designated by the numeral 270.

Figure 1:
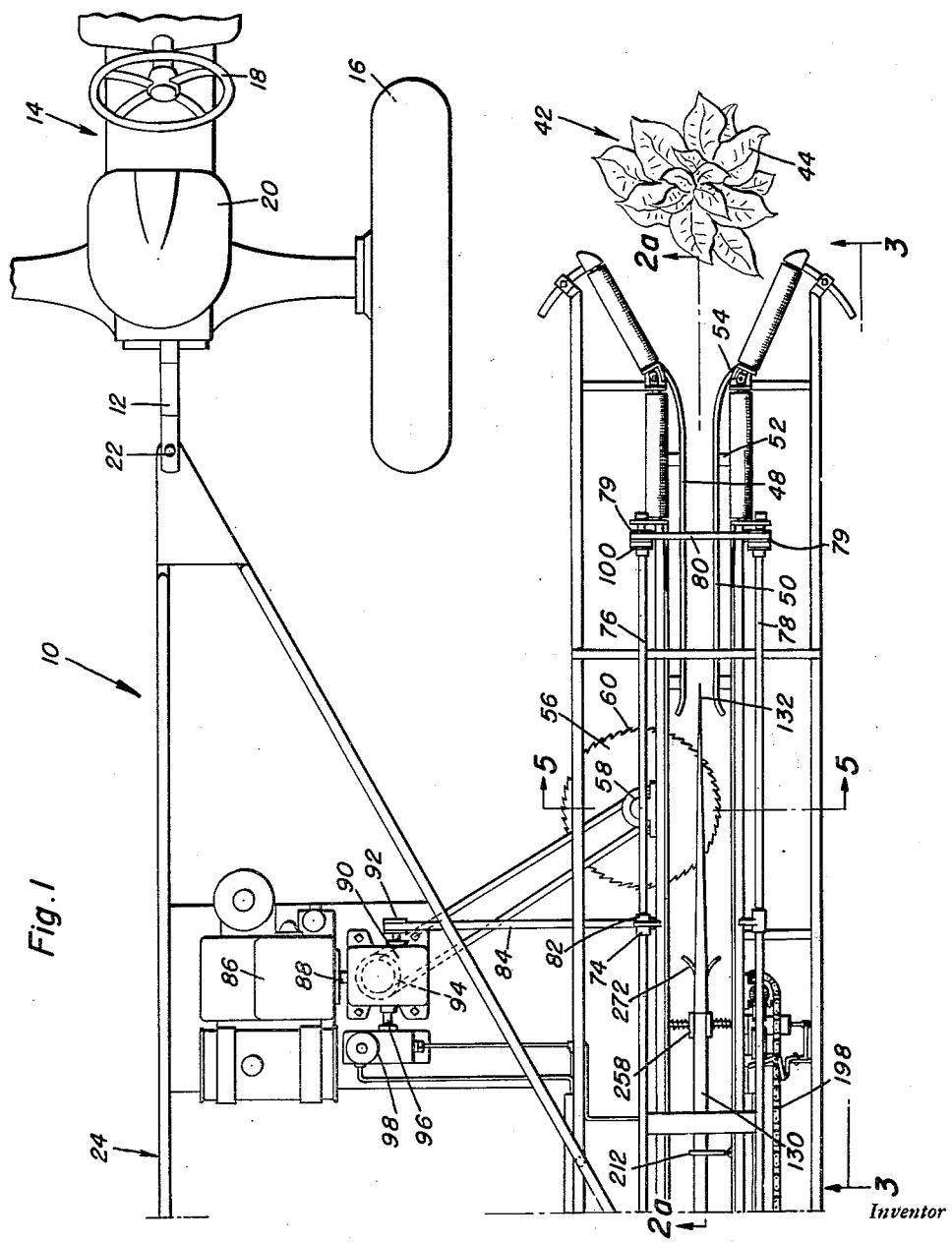
Figure 4:
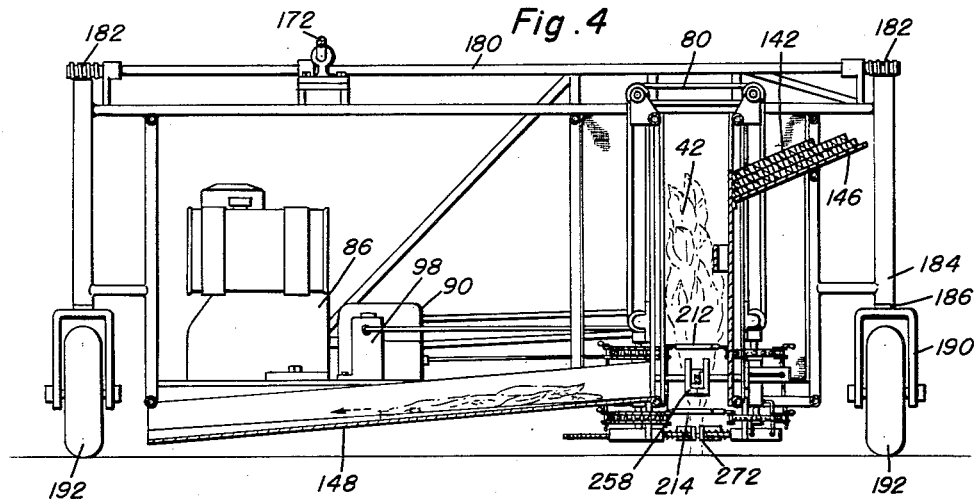
Figure 4 is a transverse vertical sectional view taken substantially upon a plane passing along section line 4—4 of Figure 1A illustrating the discharge chute for the loaded tobacco sticks.
Figure 5:
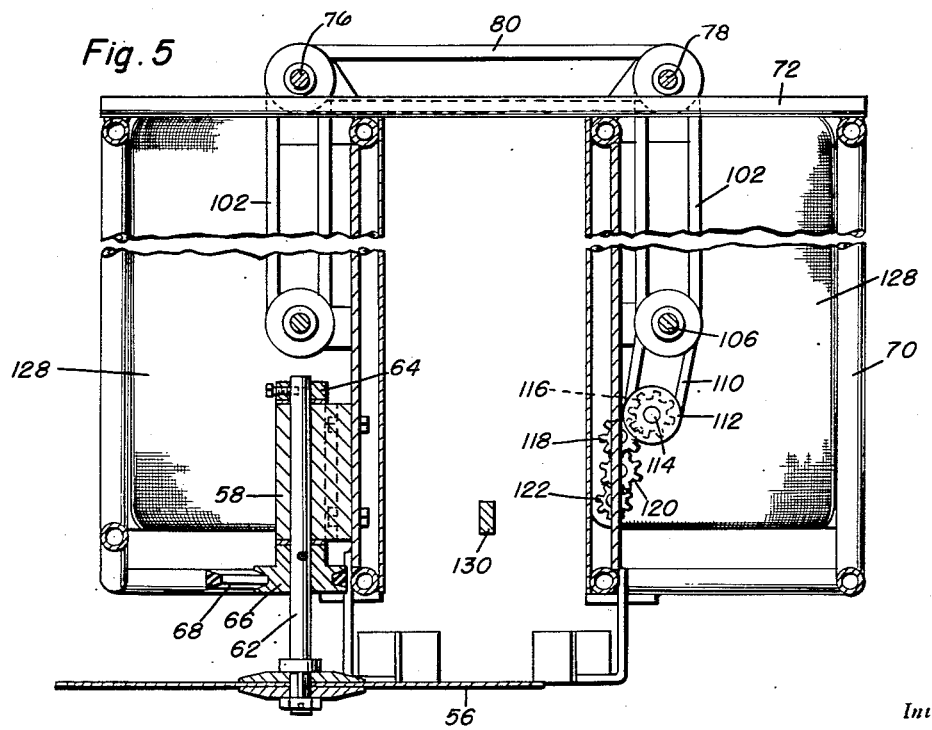
Figure 5 is a fragmentary and enlarged transverse, vertical sectional view taken substantially upon a plane passing along section line 5—5 of Figure 1 illustrating the details of construction of the rotatable saw together with the guide members associated therewith.

The gripping means 270 generally includes a pair of gripping members 272 disposed in opposing relation generally parallel to the right angular members 258 and extending forwardly therefrom and terminating in outwardly flared portions 274. It will be noted that the gripping means 270 are of a length to receive six stalks of tobacco, and they are forced outwardly by the stalks so that the piston rod 276 having springs 278 in surrounding relation thereto will move outwardly for moving a piston 280 within a cylinder 282 so that fluid will be admitted to the inlet line 266 and discharged from the outlet line 268 for moving the right angular members 258 away from the spear 130 which will permit movement of the six stalks 46 rearwardly by using the projecting members 212 and 216 on the conveyors 196. This outward movement of the piston 282 will also cause pivotal movement of the linkage which controls the movement of the clutch members 250 thereby actuating the conveyors 196. The various fluid lines receive their supply from the fluid pump 98 driven by the internal combustion engine 86 and are so interconnected that the six stalks 46 of the tobacco plants 42 will move in step-by-step relation through the machine. The stalks are gathered or bunched into a series of six at the forwardmost gripping members 270 after which the members 272 will be forced outwardly thereby actuating the conveyor 196 and withdrawing the right angular members 258 to permit the conveyor 196 to move the group of stalks rearwardly along the spear 130. As soon as the stalks move past the gripping members, the springs 276 move piston 280 outwardly for permitting return of the spear supporting members 258 to their normal position and also permitting disengagement of the conveyor 196 so that the conveyors 196 will actaute only when they are moving the stalks rearwardly along the spear 130. As the spear 130 moves forwardly with the machine and the stalks move into the longitudinal passage in the frame, the stalks will be impaled upon the pointed end of the spear. As shown in Figure 1, the point 132 of the spear 130 projects slightly forward of the saw or cutter 56 and the stalk of course will move rearwardly on the spear 130 past the saw 56 at which time it will be cut off and will then normally move wtih the spear. As the next succeeding stalk is impaled upon the spear and moves rearwardly thereon for cutting by the saw, it will push the preceding stalk rearwardly on the spear. Approximately six large stalks are positioned on the spear rearwardly of the cutting station, the initial stalk on the spear will then engage the forwardmost gripping means 270 and will be pushed into the area between the gripping members 272 thus urging the gripping members 272 outwardly for actuating the spear gripping members for releasing the spear gripping members at this gripping station and permitting the stalks to move rearwardly on the spear. At the same time the hydraulic system will actuate the adjacent conveyor mechanism and the projecting members 212 thereon will engage approximately six of the stalks disposed rearwardly of the saw 56 and move them rearwardly on the spear until they are passed through the gripping means 270 which will then permit the gripping members 272 to again approach each other for causing the operation or inward movement of the spear gripping members 258 and subsequent inactivation of the chained conveyor. However, the time lag is such and the arrangement is such that the six stalks will be moved to the second gripping means 270 for operation thereof with the first operating the second gripping means simultaneously with the return to a normal position of the forwardmost gripping means.

In summarizing the operation of the invention, the tobacco cutting machine 10 is drawn by the tractor over the tobacco field in straddling relation to a row of tobacco plants 42. As the tobacco plants enter the area between the longitudinal guide members, the upwardly moving conveyor belts 128 engage the leaves 44 of the tobacco plants 42 and move them upwardly and force them alongside the stalk thereof, after which the saw 56 will cut the stalk 46 adjacent the ground surface and the stalk 46 is forced onto the spear 130 and rearwardly thereon by the addition of another stalk thereon. After the stalks are initially impaled on the spear 130, the rearwardly conveying chains 198 and 200 forming the conveying mechanisms 196 which are in staggered relation will alternatively and sequentially move the tobacco plants 42 rearwardly wherein the tobacco plants or the stalks thereof are sequentially gripped and released as is the spear 130, thereby permitting the stalks 46 to pass along the spear 130 and still permitting the spear to be supported in a horizontal position. As the grouped or bunched stalks reach the rear of the spear 130, they pass onto the tobacco sticks 142 wherein an operator standing on the platform 150 may discharge the loaded tobacco stick onto the platform which is inclined so that the loaded tobacco sticks may be deposited on the ground surface for collection or may be deposited in a suitable towed load carrying vehicle. Accordingly, it will be seen that the device permits the ready harvesting of tobacco at the expenditure of relatively little manual labor wherein the entire cutting operation and the positioning of the stalks on the tobacco sticks is automatically carried out by the machine. The steerable wheels on the frame permit ease of movement of the frame and the machine over a field and they readily permit the machine to be easily turned at the end of the field.

What is claimed as new is as follows:

1. A machine for harvesting tobacco comprising a longitudinally elongated steerable mobile frame, said frame including vertically extending members providing vertical height thereto, said frame having a longitudinally extending passage defining a path for tobacco stalks extending upwardly from the bottom of the frame whereby the frame may straddle the row of tobacco stalks being cut, longitudinally extending guide members mounted on the frame and extending into the passage adjacent the bottom of the frame, each of said guide members flaring outwardly at the forward end thereof for guiding tobacco stalks between the guide members, a pair of transversely spaced vertically disposed endless belt members mounted on said frame adjacent the forward end thereof, said belt members having vertical flights defining the forward portion of the passage whereby tobacco stalks passing between the belt members will be lifted upwardly, means mounted on the frame for driving said endless belt members, a saw rotatably mounted on said frame and being disposed in a horizontal plane below the plane of the lower ends of the belt members with the periphery of the saw disposed in the path of movement of the tobacco stalks through the passage for cutting the stalks adjacent the ground surface, and means on said frame for conveying the cut tobacco stalks rearwardly on the frame.

2. A machine for harvesting tobacco comprising a longitudinally elongated steerable mobile frame including a framework having longitudinal, horizontal and vertical components defining a skeletonized frame having a downwardly opening longitudinal passage therein for receiving tobacco stalks during forward movement of the frame, said longitudinal passage being defined by longitudinally extending guide rails forming a portion of the frame with the forward ends of the guide rails being flared outwardly for guiding tobacco plants into the passage, the forward portion of the longitudinal passage being defined by a pair of transversely spaced endless belt assemblies disposed in vertical relation and having spaced inner flights moving upwardly for engaging the leaves of tobacco plants entering the longitudinal passage thus raising the tobacco leaves upwardly into juxtaposition to the central tobacco stem of the tobacco plant, means supported on the frame for transmitting driving force to the endless belt assemblies, a cutter mounted on said frame below the guide rails with the cutter projecting into the passage for cutting the stalks of the tobacco plants, said cutter being disposed rearwardly of the vertical belt assemblies whereby the cutter will cut the tobacco stalks adjacent the ground surface and below the leaves, means mounted on said frame for transmitting driving force to said cutter, longitudinally extending means supported from the frame and disposed between the longitudinal guide rails for supportingly engaging the tobacco stalks before and after the cutting operation, means mounted on the frame for conveying the cut tobacco stalks rearwardly in the passage, and means at the rear end of the stalk supporting means and being supported from the frame for receiving the cut tobacco stalks.

3. The combination of claim 2 wherein said means for supporting the cut tobacco stalks includes a longitudinally elongated spear having a pointed forward end disposed slightly forwardly of the cutter, said spear being relatively small in cross sectional area throughout its length for impaling the tobacco stalks thereon, means on the frame extending inwardly into the passage for supportingly engaging said spear, said last named means including a plurality of supporting assemblies disposed in longitudinally spaced relation for supporting the elongated spear at longitudinally spaced points, and means responsive to movement of the cut stalks rearwardly on the spear for sequentially releasing the spear and permitting passage of the stalks thereon, movement of the stalks rearwardly on the spear and subsequent re-engagement between the supporting means and the spear.

4. The combination of claim 2 wherein said means for moving the tobacco stalks rearwardly in the passage includes a plurality of longitudinally spaced chain conveyor assemblies disposed horizontally with an inner flight parallel with the passage with the conveyor assemblies being mounted on the frame, each of said chain conveyor assemblies including a projecting peg thereon projecting into the passage when the peg is on the inner flight for movement into engagement with the stalks of tobacco impaled on the spear for moving the same rearwardly, and means on each conveyor assembly for retracting the projecting peg when the same is not in registry with the passage.

5. The combination of claim 2 wherein said means for receiving the tobacco stalks at the rear of the passage includes means supported on the frame for receiving a tobacco stick in longitudinal alignment with the longitudinal stalk supporting means, a supply hopper on said frame for providing a supply of empty tobacco sticks and an inclined ramp on the frame adjacent the tobacco stick holding means for guiding the discharge of the loaded tobacco sticks.

References Cited in the file of this patent

UNITED STATES PATENTS

| | | |
|---|---|---|
| 1,090,747 | Nunnelley | Mar. 17, 1914 |
| 1,323,404 | Motter | Dec. 2, 1919 |
| 2,438,393 | Hamner | Mar. 23, 1948 |